US008630179B1

(12) United States Patent
Cotter (10) Patent No.: US 8,630,179 B1
(45) Date of Patent: Jan. 14, 2014

(54) INTERNET PROTOCOL VIDEO QUALITY OF SERVICE

(75) Inventor: Anthony John Cotter, Ballincollig (IE)

(73) Assignee: ARRIS Enterprises, Inc., Suwanee, GA (US)

( * ) Notice: Subject to any disclaimer, the term of this patent is extended or adjusted under 35 U.S.C. 154(b) by 245 days.

(21) Appl. No.: 13/040,391

(22) Filed: Mar. 4, 2011

Related U.S. Application Data (60) Provisional application No. 61/310,736, filed on Mar. 5, 2010.

(51) Int. Cl.
*H04L 1/00* (2006.01)

(52) U.S. Cl.
USPC ........................................... 370/235

(58) Field of Classification Search
USPC ........... 370/229–235, 252, 31, 395.5–395.52, 370/412–413
See application file for complete search history.

(56) References Cited

U.S. PATENT DOCUMENTS

| | | | | |
|---|---|---|---|---|
| 6,898,182 | B1 * | 5/2005 | Cloonan | 370/232 |
| 7,002,914 | B2 * | 2/2006 | Cloonan | 370/232 |
| 7,088,678 | B1 * | 8/2006 | Freed et al. | 370/230 |
| 2010/0309783 | A1 * | 12/2010 | Howe | 370/230 |

OTHER PUBLICATIONS

CM-TR-MHA-V02-081209, EQAM Architectural Overview Technical Report, Cable Television Laboratories, Inc., 39 pages, 2008.*
CM-SP-M-OSSI-I08-081209, M-CMTS Operations Support System Interface Specification, Cable Television Laboratories, Inc., 47 pages, 2008.*

* cited by examiner

Primary Examiner — Frank Duong
(74) Attorney, Agent, or Firm — Troy A. Van Aacken (57) ABSTRACT

Methods, systems, and apparatus used to identify how long a packet associated with a CPE device can be delayed based upon information associated with the CPE device and/or the stream. In some examples, during periods of high volume, packets associated with a recipient device and/or the stream can be delayed based upon identification of an acceptable latency.

22 Claims, 4 Drawing Sheets

INTERNET PROTOCOL VIDEO QUALITY OF SERVICE

RELATED APPLICATIONS

This application is a non-provisional application claiming the benefit of U.S. Provisional Application Ser. No. 61/310,736, entitled "Internet Protocol Video Quality of Service," filed Mar. 5, 2010, which is hereby incorporated by reference in its entirety.

TECHNICAL FIELD

This disclosure relates to quality of service for internet protocol video.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

The number of services provided through the MSO over a hybrid fiber-cable (HFC) network can lead to overloading of the network. Video traffic in particular can be especially burst oriented, thereby tending to overload the network. Current methods for dealing with network overload include delay packets within a jitter buffer by selecting packets for buffering based upon the percentage at which a flow is using an associated maximum traffic rate. While this method is equitable, it may lead to excessively delayed packets on latency sensitive transmissions.

BRIEF DESCRIPTION OF THE DRAWINGS

Like reference numbers and designations in the various drawings indicate like elements.

DETAILED DESCRIPTION

In some implementations of this disclosure, systems and methods can operate to provide quality of service (QoS) for video passed via internet protocol (IP) transmissions. IP video QoS can be used to delay packets associated with CPE devices and/or individual streams based upon the characteristics of the device and/or stream. For example, a "MaxDS-Latency" parameter in a configuration file used during registration with a cable modem termination system (CMTS) can be used to determine how much latency can be applied to packets in the stream. Thus, packets from the streams can be selected for delay based upon, for example, the ability of a CPE device to handle the delay, ability of the stream to handle delay, QoS parameters, etc.

Figure 1:
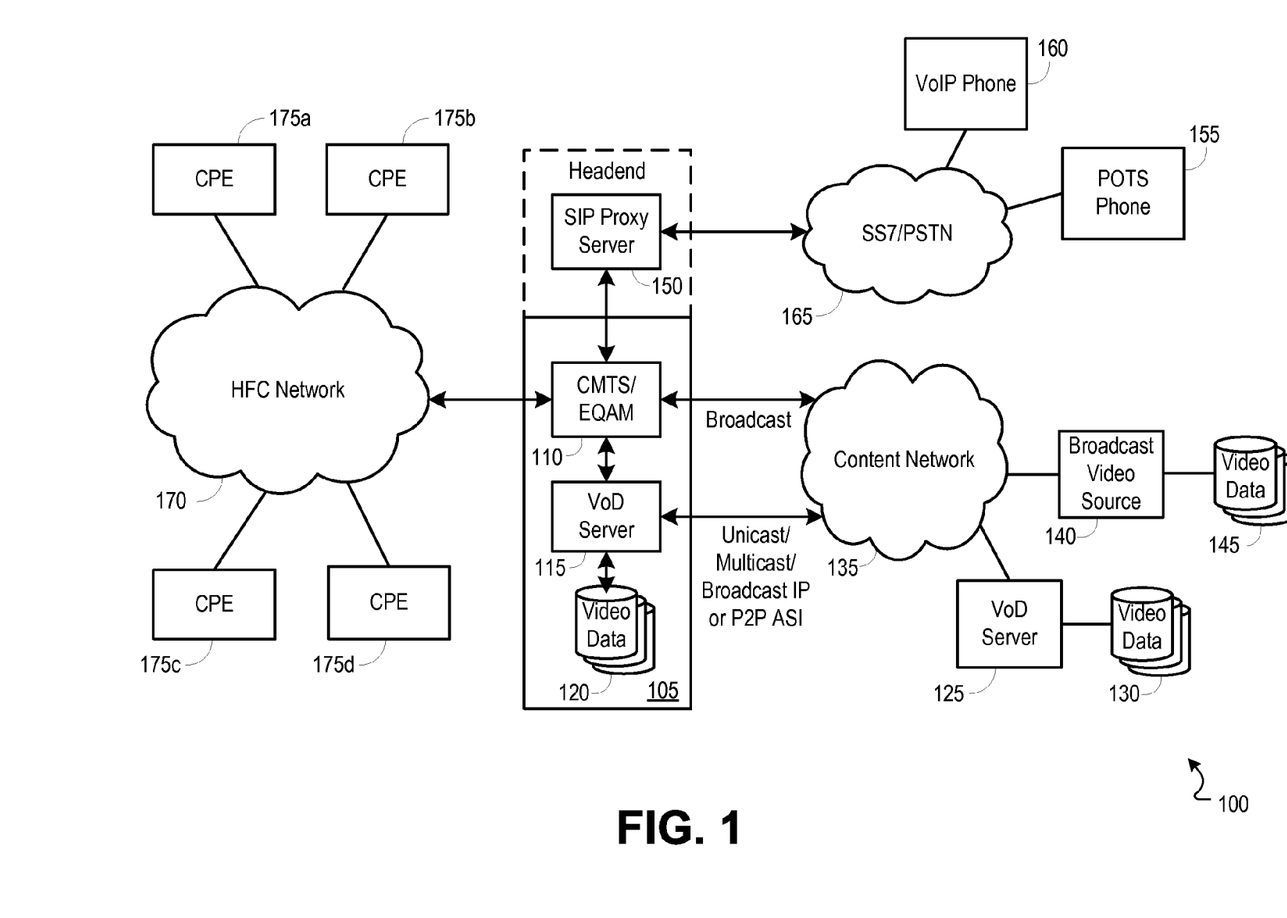
FIG. 1 is a block diagram illustrating an exemplary network environment operable to include internet protocol video quality of service.

FIG. 1 is a block diagram illustrating an exemplary network environment 100 operable to include QoS for IP video streams. In some implementations, a headend 105 can provide video, data and voice service to a subscriber. The headend 105 can include devices such as an edge quadrature amplitude modulation (EQAM) device and a cable modem termination system (CMTS), or a combined CMTS/EQAM 110. In some examples, video streams can be received at a video on demand (VoD) server 115 from local video data stores 120. In other examples, video streams can be received at the VoD server 115 from a remote or distributed VoD server 125 and associated video data store 130 through content network 135. The content network 135 can be an IP network operable to communicate packets to and from the remote or distributed VoD server 125. In other implementations, the content network 135 can comprise multiple networks operable to provide video data from a source 125, 140 to the headend 105. In yet another example, a broadcast video feed can be received from a broadcast video source 140 and associated video data store 145 through a content network 135. In some implementations, these video streams sent through the content network 135 can enter the headend 105 as raw moving picture experts group (MPEG) streams, or any other streaming video protocol supported by the headend 105 CMTS/EQAM device 110 or VoD server 115.

In some implementations, data services can be handled by the headend 105 through a CMTS 115. The CMTS 115 can receive data signals from user device(s) 175a-d and server(s) (not shown) through an external network (e.g., the Internet). The external network, for example, can operate using Internet protocol (IP), sending data packets to and receiving data packets from the headend 105. In some examples, the CMTS can be paired with a SIP proxy server 150 operable to provide voice over internet protocol (VoIP) services with connectivity to POTS phone(s) 155 or VoIP phone(s) 160 through the public switched telephone network (PSTN) 165.

The CMTS/EQAM 110 can operate to modulate signals onto a carrier waveform. The carrier waveform can include data and/or video streams, in any of broadcast, multicast or unicast (e.g., point-to-point) formats for transmission to one or more cable modems and/or set top boxes 175a-d via a hybrid fiber-coax (HFC) network 170.

In some implementations, prior to modulating the signals onto carrier waveforms, the CMTS/EQAM 110 can operate to identify an acceptable latency for a packet associated with a device and/or stream. When very little is known about video streams, like when the stream framing data is pre-encrypted, it is difficult to know the exact rate at which the CPE device 175a-d is consuming the data. Thus the CMTS/EQAM 110 cannot tell if the CPE device 175a-d buffer is close to underflowing or not. In this case, the consumption rate of the packets in the CPE device 175a-d cannot be predicted any better than from the arrival rate of the packets into the CMTS/EQAM 175a-d. As such, the latency can be used to delay all video streams by the same amount when congestion occurs. Congestion, for example, includes those situations when there are more packets arriving at the CMTS/EQAM 110 than can fit on the RF channel(s). This applied latency will reduce the peak delay seen by any individual CPE device and thereby reduce the probability of an under-run occurring compared to random transmission or bitrate based transmission.

In some implementations where the video stream can have a fixed bitrate, a variable bit rate, an adaptable bitrate or a combination thereof and where packets can arrive at the CMTS in response to requests for discrete blocks of video data (e.g., in response to HTTP GETs from a video player or from an intermediate network element which stores or alters video packets or communication protocols) the threshold latency can be identified as the difference between the buffer level at which the stream is subject to no latency and the buffer level at which the receiver can adapt the stream bitrate downwards due to perceived network congestion. This identified threshold latency can be a fixed value, a configured value or it can be learned from an earlier bitrate adaptation in the same player.

The buffer can be identified as full by the CMTS if the receiver of the video packets waits for a reasonable amount of time after completion of the transfer of the current block of video data before initiating a subsequent transfer. Latency can be applied to subsequent block transfers by delaying packets on their way to the buffer so that the current block does not complete before the next block is due to start. The amount of latency added (e.g., since the last time that the buffer was known to be full) can be estimated from the increase in interval between the starts of blocks of video data or from the average bitrate of the video stream. The latency can be removed occasionally for a particular video stream in order to resynchronise to the point where the receiver considers the buffer to be full.

In another scenario, when the CPE device 175a-d buffer size is known, then the packet delay during congestion for a particular CPE device 175a-d can be based on its buffer size. Therefore CPE devices 175a-d with larger buffers can be allowed to suffer more delay (congestion latency) since they are in a better position to tolerate latency. When the buffer size is expressed as a latency at the configured max-traffic-rate, then 100% represents the duration for all data in a full buffer to be used up. This scheme could allow a greater latency build up in the CMTS/EQAM 110 (or a deficit in the CPE device 175a-d) without an under-run occurring in the CPE device 175a-d buffer than possible if the CPE device 175a-d buffer size is not known. However, it is not totally deterministic because the CPE device 175a-d may consume the data in large bursts due to its VBR nature so under-runs may occur even when the CMTS/EQAM 110 thinks that the buffer is still 50% full.

In some implementations, the buffer size of the CPE device 175a-d can be identified by configuring a "Max_DS_Latency" parameter in the service flow with a value corresponding to the backlog in the CPE device 175 buffer when the CPE device 175a-d starts playing it out. Using the "Max_DS_Latency" parameter would involve converting the buffer size in bytes to a DOCSIS latency in microseconds based on the configured flow "Max_Traffic_Rate" where "Max_DS_Latency"=(8000000*Buffer Size in bytes)/Max_Traffic_Rate. In some examples, this can be configured automatically via PCMM, can be over-ridden manually via CLI, or configured in a modem configuration file for a static unicast IP video stream. For example, during the startup and registration processes for the CPE devices 175a-d, configuration files are provided for the CPE device(s) 175a-d from a TFTP server. These configuration files are passed to the CMTS/EQAM 110 for registration with the headend 105, thereby authenticating the CPE device(s) 175a-d for receipt of signals from the headend 105. One of the fields included in the configuration file per the DOCSIS standard is the "MaxDSLatency" parameter. Historically, this field has remained unused. However, in some implementations of this disclosure, this field can be used by the MSO to specify a buffer size associated with the CPE device(s) 175a-d.

In those examples using the Max_DS_Latency parameter, the DOCSIS CMTS can obtain the buffer size by doing the inverse calculation so Buffer Size=(Max_DS_Latency*Max_Traffic_Rate)/8000000. In some implementations, the DOCSIS Max_Burst parameter is set much lower than the buffer size so that the CMTS/EQAM 110 will not burst too much when the RF channel is quiet.

Upon identifying the buffer size associated with a receiving CPE device 175a-d, the CMTS/EQAM 110 can determine how much delay a CPE device 175a-d can support, given its buffer size. This determination can be used to determine how much packets destined for the CPE device 175a-d can be delayed before the buffer at the CPE device 175a-d experiences a buffer underrun. Such buffer underruns can, for example, result in jitter or dropped packets.

In other implementations, timing information can be used to determine how much delay the device can support. This timing information can identify, for example, how much time it takes for a CPE device 175a-d to consume a data packet (or packets). If timing information associated with the stream can be accessed (e.g., PCR information in an MPEG-TS stream) then a QoS module at the CMTS/EQAM 110 can run a software PLL on the timing packets to establish a timing reference for that stream. The QoS module can thereby compare the arrival time of a timing packet with the predicted arrival time from the software PLL. The difference between the actual arrival time and the predicted arrival time can be identified as network jitter.

In some implementations, the CMTS/EQAM 110 can compensate for this network jitter by modifying the CMTS/EQAM 110 originated timestamps on individual packets. If a maximum expected jitter is configured for a video source, then the CMTS/EQAM 110 can hide this jitter by introducing a fixed latency for all packets (dejitter buffer). For example, if the maximum latency is 10 milliseconds and if the CMTS determines that the current jitter is 3 ms (late packet), then the CMTS timestamp applied to arriving packets can be made earlier by that 3 ms so that the CMTS will send this packet after 7 ms instead of after 10 ms.

In some implementations, the origin of packets can be used to identify how much the packets have been delayed on the way from that source. For example, if it can be determined that several streams come from the same source (e.g., based upon source IP address) then it is likely that all streams from that source suffer the same network jitter. Therefore the timing updates for any stream from that source can be used to modify the CMTS/EQAM 110 timestamps on packets of all streams from that source to give more frequent jitter updates than for any individual stream.

In some implementations, stream frame information can be used to determine how sensitive a CPE device is to packet delay associated with a data stream. For example, when the stream frame information is not encrypted, the CMTS/EQAM 110 can parse the data to determine when each packet will be consumed by the CPE device 175a-d. Since the CMTS/EQAM 110 knows how much data is in the buffer of each CPE device 175a-d, the congestion latency can be calculated for each stream. Thus, the congestion latency of all streams can be allowed to increase to close to 100% (deficit of 100% in the CPE device 175a-d) before any stream will experience an under-run in its buffer. By de-queuing packets from streams such that all streams have the same congestion latency at all times (e.g., the deficit grows evenly from 0 towards 100%), a more efficient statistical multiplexing on the RF cable within the constraints of the CPE device 175a-d buffer sizes can be realized without transcoding the stream or dropping packets.

In such implementations, it can still be desirable to maintain a CMTS/EQAM 110 dejitter buffer for these streams so that the CPE device 175a-d buffer can be fully utilized to handle RF congestion latency and the CMTS buffer can handle network latency. If a jitter buffer is not maintained, then a late packet will represent a missed transmission opportunity to the CPE device 175a-d when the RF channel may have had free capacity.

In additional implementations, the dejitter buffer can be used in conjunction with the CPE device 175a-d buffer. Thus, for example, the packets being held in the CMTS/EQAM 110 per-stream dejitter buffer can be forwarded to the CPE device 175a-d buffer early if space is available. This space will be available if the packets in the CPE device 175a-d buffer are for a time that the instantaneous bitrate of the stream was low resulting in a lower byte requirement to store the same duration of video. This allows some packets to be sent to the CPE device 175a-d in advance to facilitate better ability to handle congestion.

Figure 2:
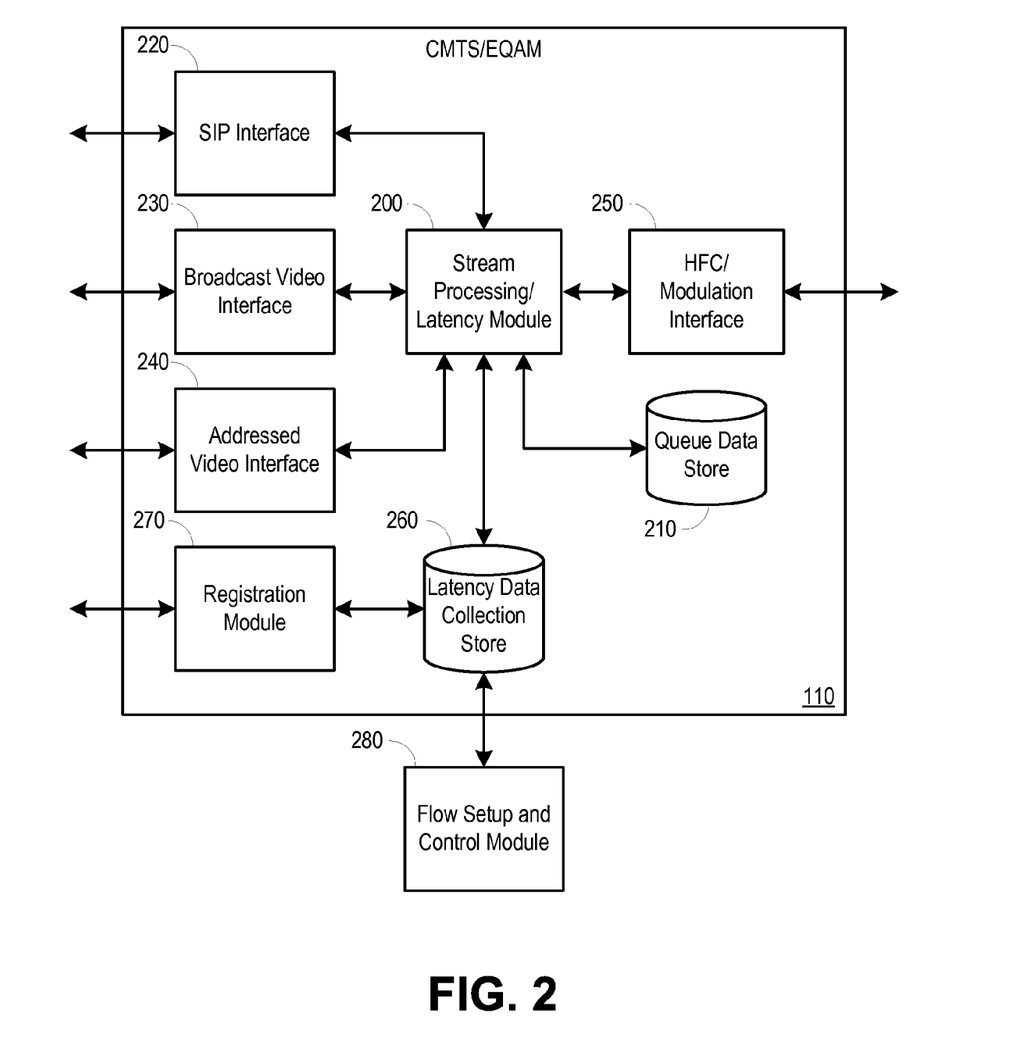
FIG. 2 is a block diagram illustrating an example cable modem termination system providing internet protocol video quality of service.

FIG. 2 is a block diagram illustrating an example CMTS/EQAM 110 providing internet protocol video quality of service. In some implementations, the CMTS/EQAM 110 can include a stream processing/latency module 200. The stream processing/latency module 200 can operate to process streams and delay delivery of streams using a queue data store 210. The CMTS/EQAM 110 can also include a session initiation protocol (SIP) interface 220, a broadcast video interface 230, an addressed video interface 240 and an HFC/modulation interface 250. The SIP interface 220 can facilitate communication with a SIP server to pass voice signals back and forth between the CMTS/EQAM 110 and a PSTN via the SIP server. The broadcast video interface 230 can operate to receive broadcast MPEG streams from a broadcast video server. The addressed video interface 240 can operate to receive addressed video streams, for example, from video on demand servers. The HFC/Modulation interface can operate to provide an interface to an HFC network or to a modulator, the modulator being operable to modulate the signals onto the HFC network.

The CMTS/EQAM 110 can also include a latency data collection store 260 and a registration module 270. The registration module 270 can operate to register a CPE device with the CMTS/EQAM 110. When a CPE device is registered with the CMTS/EQAM 110, the configuration file can be saved to memory. In some implementations, the latency data collection store 260 can store at least a portion of the configuration file. For example, the latency data collection store 260 can store a "Max_DS_Latency" parameter from the configuration file. However, it should be understood that in other implementations, latency data can be retrieved from a configuration file data store.

In some implementations, the latency data collection store 260 can also receive data about a stream from an external flow setup and control module 280. The external flow setup and control module can identify, for example, the type of data being streamed, a data rate associated with the stream, timing information associated with the stream, etc. For example, the external flow setup and control module can be a VoD server or SIP server. In still further implementations, the latency data collection store can receive information about data streams collected from the stream processing/latency module 200.

The stream processing/latency module 200 can retrieve information about any individual video (or audio) stream (if available) from the latency data collection store 260. Based upon the information retrieved from the latency data collection store 260, the stream processing/latency module 200 can identify how much latency can be handled by the CPE device associated with a particular video stream. The stream processing/latency module 200 can then determine how long packets associated with the video stream can be delayed without disrupting the presentation of video data to an end user. Thus, when the network is experiencing a high data volume situation, the stream processing/latency module 200 can intelligently delay packets for the longest period of time before dropping any packets.

Moreover, with more information about the stream, the stream processing/latency module 200 can make more intelligent decisions about which streams to drop packets from if the network becomes overloaded for an extended period of time. For example, dropping a data packet from a data connection or an audio packet from an audio connection may be preferable to dropping a video packet form a video connection because the video data is more immediately visible to the end user than a small missing audio segment.

After delaying delivery of a packet based upon the identified ability of a CPE device to handle latency associated with a stream, the stream processing/latency module 200 can cause the packet to be sent to a receiving CPE device after a period of time specified has elapsed. For example, the stream processing/latency module 200 can retrieve a delayed packet form the queue data store and forward the packet to the HFC interface 250.

Figure 3:
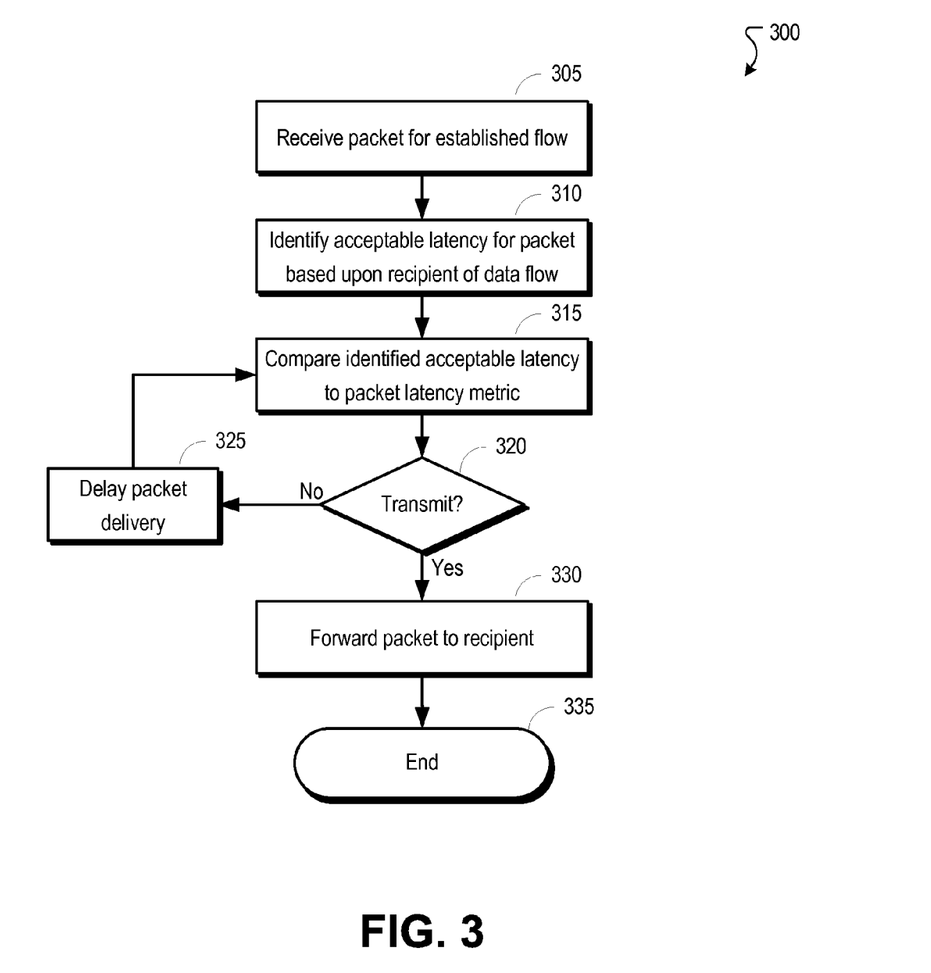
FIG. 3 is a flowchart illustrating an example process for providing internet protocol quality of service.

FIG. 3 is a flowchart illustrating an example process 300 for providing internet protocol quality of service. The process 300 can begin at stage 305 when packet for an established flow is received. The new packet can be received at a network device, for example, by an external network interface (e.g., SIP interface 220, broadcast video interface 230, or addressed video interface 240 of FIG. 2). The external network interface can support the protocol used by the external network, and can forward the received packets to a stream processing module (e.g., a stream processing/latency module).

At stage 310, an acceptable latency for the packet is identified based upon the recipient of the data flow. The acceptable latency for the packet can be identified, for example, by a stream processing module (e.g., stream processing/latency module 200 of FIG. 2) in conjunction with a latency information data store (e.g., latency data collection data store 260 of FIG. 2). In some implementations, a latency associated with the packet can be identified based upon a type of stream the packet comprises. For example, a data stream might have a first latency tolerance, while a voice stream might have a second latency tolerance and a video stream might have a third latency tolerance. In another implementation, the acceptable latency can be based upon one or more characteristics associated with a receiving CPE device, e.g., including a buffer size, or buffer utilization at the recipient CPE device. For example, if the recipient CPE device has a large buffer, the data packet can be delayed longer than if the recipient CPE device has a small buffer. In still further implementations, timing parameters associated with the stream can be measured to determine a consumption rate of the packets at the CPE device, thereby facilitating identification of the latency that can be applied to the packet before the receiving CPE device experiences an underrun in its jitter buffer.

At stage 315, an acceptable latency can be compared to a latency metric for the packet. The acceptable latency can be compared to the latency metric, for example, by a stream processing module (e.g., stream processing/latency module 200 of FIG. 2). In some implementations, the latency metric can be the total amount of time the packet has been delayed by a latency buffer. The acceptable latency can be identified, for example, based upon the buffer size of the receiving CPE device. Alternatively or additionally, the acceptable latency can also be based upon, for example, utilization of the buffer at the receiving device. In some implementations, when the latency metric approaches within a threshold of the acceptable latency, the packet can be transmitted to the receiving CPE device to avoid jitter. In other implementations, the acceptable latency can be set such that when the latency metric is equal to (or greater than) the acceptable latency value, the packet can be transmitted to the receiving CPE device.

At stage 320, a determination of whether to transmit the packet is made. The determination of whether to transmit a packet can be made, for example, by a stream processing module (e.g., a stream processing/latency module 200 of FIG. 2). As described above, the comparison of the latency metric to an identified acceptable latency can be used to determine whether to transmit the packet to the recipient CPE device.

If the determination is made that the packet is not to be delivered, at stage 325, a packet delivery is delayed. The delivery of the packet can be delayed, for example, by a stream processing module (e.g., stream processing/latency module 200 of FIG. 2), in conjunction with a latency buffer (e.g., queue data store 210 of FIG. 2). In some implementations, the packet delivery can be delayed by storing the packet to a latency buffer. The latency buffer can be a memory space used to temporarily store packets by the stream processor.

However, if the determination is made that the packet is to be delivered, at stage 330, the packet is forwarded to the recipient. The packet can be forwarded to the recipient, for example, by a stream processing module (e.g., stream processing/latency module 200 of FIG. 2), in conjunction with a network interface (e.g., HFC network interface 250 of FIG. 2). The process ends at stage 335.

In some implementations, it should be understood that the determination to enter process 300 can be made based upon packet traffic levels reaching a predetermined threshold. Additionally, it should be understood that the process 300 can include a parallel process of selecting stored packets from a latency buffer for dropping. Packets can be identified for dropping based upon any of a number of known algorithms, each of which is intended to be included within the scope of this disclosure.

Figure 4:
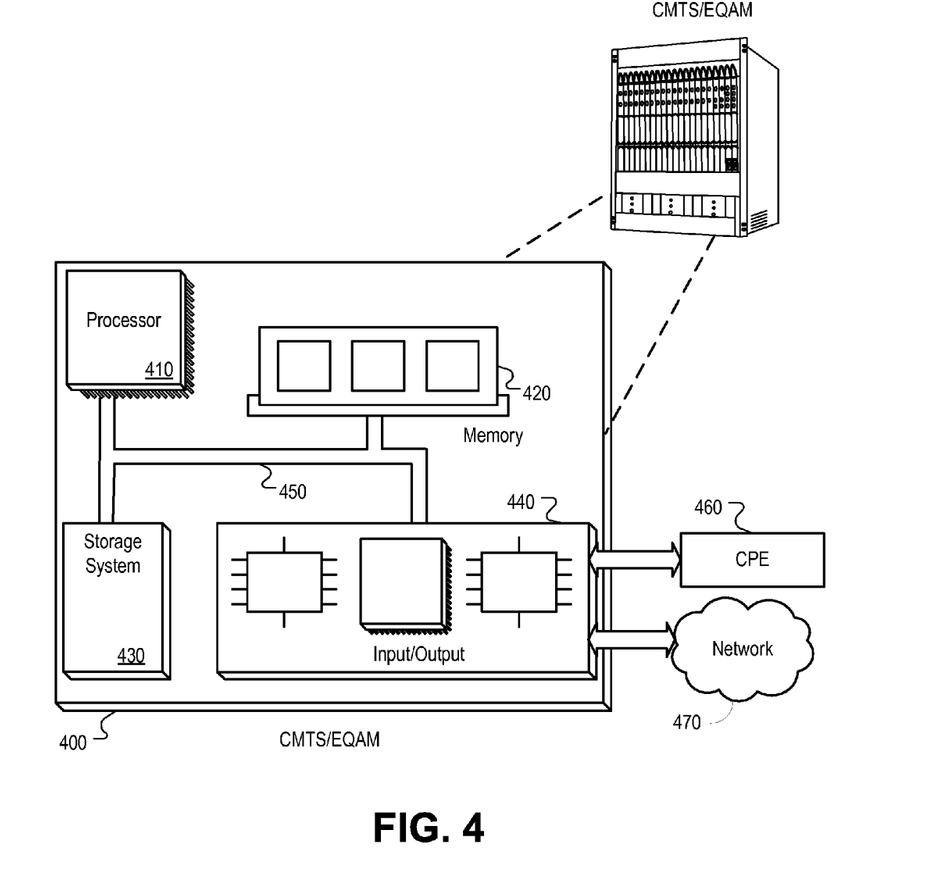
FIG. 4 is a block diagram of an example CMTS/EQAM device that can include internet protocol video quality of service.

FIG. 4 is a block diagram of an example CMTS device that can include QoS for IP video. However, it should be understood that many different kinds of network devices (e.g., including network hubs, bridges, routers, edge termination devices, etc.) can implement a latency based random early discard mechanism. It should be understood that there are many ways to implement a CMTS. However, in an condensed implementation, the CMTS 400 can include a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

In some implementations, the storage device 430 is capable of providing mass storage for the system 400. In one implementation, the storage device 430 is a computer-readable medium. In various different implementations, the storage device 430 can, for example, include a hard disk device, an optical disk device, flash memory or some other large capacity storage device.

The input/output device 440 provides input/output operations for the system 400. In one implementation, the input/output device 440 can include one or more tuners, demodulators, a SIP interface, a network interface device, e.g., an Ethernet card, an addressed video stream interface, a broadcast video stream interface, a serial communication device, e.g., and RS-232 port, and/or a wireless interface device, e.g., and 802.11 card. In another implementation, the input/output device can include driver devices configured to receive input data and send output data to other input/output devices, such as one or more network devices 460 (e.g., VoD server(s), broadcast video server(s), data server(s), SIP server(s), etc.), as well as sending communications to, and receiving communications from a second (e.g., proprietary) network 470.

The network device (e.g., CMTS, EQAM, network router, etc.) of this disclosure, and components thereof, can be realized by instructions which, upon execution, cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   receiving a packet associated with an established data flow at an edge termination device;
   identifying an acceptable latency value for the received packet at a stream processing module within the edge termination device, the acceptable latency value being based upon a buffer state of a recipient device associated with the data flow;
   comparing the acceptable latency value to a measured latency value associated with the packet at the stream processing module;
   scheduling and transmitting the packet from the edge termination device based upon comparing the acceptable latency value to the measured latency value associated with the packet, wherein the scheduling and transmitting are based upon consideration of acceptable latency values associated with a plurality of data flows including the established data flow.

2. The computer-implemented method of claim 1, further comprising:
   associating the received packet with the established data flow.

3. The computer-implemented method of claim 1, wherein identifying the acceptable latency value comprises identifying a buffer size of the recipient device associated with the packet.

4. The computer-implemented method of claim 3, wherein identifying the acceptable latency value further comprises identifying a buffer usage associated with the recipient device.

5. The computer-implemented method of claim 3, wherein the buffer size of the recipient device is identified by configuring a Max_DS_Latency parameter during setup of the data flow.

6. The computer-implemented method of claim 5, wherein the Max_DS_Latency parameter is set to a value corresponding to the backlog in a data buffer of the recipient device.

7. The computer-implemented method of claim 6, further comprising converting the buffer size from bytes to a latency expressed in microseconds based on the configured data flow for a Max_Traffic_Rate parameter.

8. The computer-implemented method of claim 7, wherein the Max_DS_Latency parameter comprises:

$$\frac{8000000 * Buffer\_Size_{bytes}}{Max\_Traffic\_Rate}.$$

9. The computer-implemented method of claim 8, wherein the Max_DS_Latency parameter is configured automatically using Packet Cable Multi-Media.

10. The computer-implemented method of claim 9, wherein the Max_DS_Latency parameter is configured during a registration process with a cable modem termination system.

11. The computer-implemented method of claim 1, wherein identifying the acceptable latency value for a recipient comprises identifying timing information associated with the data flow by running a phase lock loop on a program clock reference associated with the data flow.

12. The computer-implemented method of claim 11, wherein the difference between an actual arrival time and a predicted arrival time comprises network jitter, and a cable modem termination system or edge-quadrature amplitude modulation device is operable to compensate for the network jitter by modifying timestamps on individual packets associated with the data flow.

13. The computer-implemented method of claim 1, wherein an originating device is used to identify a measured latency for the received packet.

14. The computer-implemented method of claim 1, further comprising using stream information identifying when the received packet will be consumed associated with the data flow to identify a sensitivity of the recipient device to packet delay.

15. One or more non-transitory computer readable media operable to cause a processor, upon execution of the one or more computer readable media, to cause the processor to:
receive a packet associated with an established data flow;
identify an acceptable latency value for the received packet based upon state information for a recipient device associated with the data flow, the acceptable latency value comprising an amount of time by which the packet can be delayed without adversely affecting the data flow;
compare the acceptable latency value to a measured latency value associated with the packet;
schedule and transmit the packet based upon comparing the acceptable latency value to the measured latency value associated with the packet.

16. The one or more computer readable media of claim 15, wherein the processor is operable to identify an acceptable latency value based upon identifying a buffer size of the recipient device, and to identify a buffer usage associated with the recipient device.

17. The one or more computer readable media of claim 16, wherein the buffer size of the recipient device is identified by configuring a Max_DS_Latency parameter during setup of the data flow.

18. The one or more computer readable media of claim 17, wherein the Max_DS_Latency parameter is set to a value corresponding to the backlog in a data buffer of the recipient device.

19. The one or more computer readable media of claim 18, wherein the processor is further operable to convert the buffer size from bytes to a latency expressed in microseconds based on the configured data flow for a Max_Traffic_Rate parameter.

20. The one or more computer readable media of claim 15, wherein identifying the acceptable latency value for a recipient comprises identifying timing information associated with the data flow by running a phase lock loop on a program clock reference associated with the data flow.

21. The one or more computer readable media of claim 20, wherein the difference between an actual arrival time and a predicted arrival time comprises network jitter, and a cable modem termination system or edge-quadrature amplitude modulation device is operable to compensate for the network jitter by modifying timestamps on individual packets associated with the data flow.

22. The one or more computer readable media of claim 15, further comprising using stream information identifying when the received packet will be consumed associated with the data flow to identify a sensitivity of the recipient device to packet delay.

* * * * *